United States Patent [19]
Baker et al.

[11] Patent Number: 4,834,480
[45] Date of Patent: May 30, 1989

[54] COMPOSITE CHANNEL WAVEGUIDES

[75] Inventors: Gregory L. Baker, Tinton Falls; Janet L. Jackel, Holmdel; Nicholas E. Schlotter, Colts Neck, all of N.J.

[73] Assignee: Bell Communications Research, Inc., Livingston, N.J.

[21] Appl. No.: 184,286

[22] Filed: Apr. 21, 1988

[51] Int. Cl.$^4$ ............................................. G02B 6/10
[52] U.S. Cl. ................................................ 350/96.12
[58] Field of Search ................ 350/96.11, 96.12, 96.34

[56] References Cited

PUBLICATIONS

"A Planar-Nonplanar Conformational Transition in Conjugated Polymer Solutions", G. N. Patel et al., J. Chem. Phys. 70(9), pp. 4387-4392, May 1, 1979.
"Organic Crystals Growth for Optical Channel Waveguides", S. Tomaru et al., Optics Communications, vol. 50, No. 3, pp. 154-156, Jun. 1, 1984.
"Organic and Polymeric Thin Films for Nonlinear Optics", S. T. Kowel et al., Optical Engineering, vol. 26, No. 2, pp. 107-112, Feb. 1987.
"Strip-Loaded Waveguide Using an Underlay", K. V. Avudainayagam et al., Optics Letters, vol. 12, No. 6, pp. 443-444, Jun. 1987.
"Research on Nonlinear Optical Materials: An Assessment", D. H. Auston et al., Applied Optics vol. 26, No. 2, pp. 211-234, Jan. 15, 1987.
"Photoinitiated Degradation of Poly (Diacetylene)s in Solution by Random Chain Scission", M. A. Muller et al., Makromol. Chem. 185, pp. 1727-1737, 1984.
"Optical Second Harmonic Generation in Crystal Cored Fibers", B. K. Nayar, OSA Digest of the 6th Topical Meeting on Integrated and Guided Wave Optics, Paper ThA2, pp. 1-4, 1982.

*Primary Examiner*—William L. Sikes
*Assistant Examiner*—Robert E. Wise
*Attorney, Agent, or Firm*—James W. Falk; Edward M. Fink

[57] ABSTRACT

A channel waveguide structure comprises a substrate, a channel pattern defined in the substrate adjacent the top surface of the substrate, and a planar film layer on top substrate. The channel pattern comprises channels having a high index of refraction, while the film layer is made from a nonlinear organic material. In a preferred embodiment, the substrate is glass and the channel pattern comprises ion-exchanged channels. In this preferred embodiment, the nonlinear organic material is a soluble polydiacetylene, such as poly(3BCMU), poly(4BCMU), or poly(TS12). The thicknesses of the ion-exchanged channels and of the film layer can be adjusted so that the channel waveguide structure functions as a single mode waveguide for light having a wavelength in the range of 1.3 to 1.67 microns.

15 Claims, 1 Drawing Sheet

COMPOSITE CHANNEL WAVEGUIDES

FIELD OF THE INVENTION

This invention relates to novel composite channel waveguides and to methods of fabricating such waveguides. More particularly, this invention relates to single-mode and multi-mode channel waveguides comprising a planar film layer of a nonlinear organic material laid out on top of a glass substrate. The glass substrate has channels with a high index of refraction defined along its top surface. Light of appropriate wavelength is propagated in the planar film layer along the high index channels although neither the high index channels nor the planar film layer alone guides the light. The present invention also encompasses methods for making composite channel waveguides of the kind mentioned above.

BACKGROUND OF THE INVENTION

Optical waveguides are structures that constrain or guide the propagation of light along a path defined by the physical construction of the waveguide. The dimensions of the waveguide in the direction in which the light is confined are on the order of the wavelength of the light. Such optical waveguides comprise a region of high refractive index in which most of the optical field of the light is located surrounded by regions of lower refractive index. Typically, an optical waveguide comprises a three-layer or sandwich structure comprising a substrate, a middle or film layer, and a top layer or cover. The top layer or cover is very frequently air. The index of refraction is largest in the middle or film layer and the light is actually guided in this layer.

Optical waveguides may be constructed so as to confine the propagated light in either one or two dimensions. Optical waveguides which confine light in only a single dimension comprise a film simply laid out as a planar layer atop a substrate. Optical waveguides that confine light in two dimensions rather than one, typically comprise a film laid out as a pattern of channels or strips on the substrate. The width and depth of the channels are on the order of the wavelength of the light to be guided, thus confining the propagation of light along the channels.

Channel waveguides have been made in the past by a variety of different techniques. One of the simplest and most effective methods known for making channel waveguides in glass is by the technique known as ion exchange. According to this technique, a base glass containing, e.g., sodium ions is covered with a metal mask. The glass may typically be an alkali aluminoborosilicate or a soda-lime glass. The metal mask covers the surface of the base glass except for the places where narrow channels are desired. The base glass covered with the mask is then immersed in a molten salt bath. In some cases, an electric field is applied to the molten salt bath. The molten salt bath consists a source of single valence ions, such as alkali metal, thallium or silver ions, which diffuse into the glass in the uncovered regions and replace the sodium ions at the glass surface. This results in a pattern of channels in the glass wherein the channels have higher density and altered electronic polarizability compared to surrounding regions. Both of these effects lead to a higher index of refraction, and thus to ion-exchanged channel waveguides in the glass substrate.

Another technique which has been used in the past to form channel waveguides is photolithography. According to this well-known technique, a suitable optical material is dissolved in a solvent, spin-coated onto a substrate, and exposed to ultraviolet light through a photomask. In a typical negative photolithographic process, the ultraviolet light causes the exposed portions of optical material to polymerize and harden. After this, the unpolymerized portions of the optical material are washed away to form the waveguide channels. In a typical positive photolithographic process, the ultraviolet light causes the exposed portions of the optical material to decompose while the unexposed portions harden. The decomposed portions are then washed away. In either case, a pattern of raised strips or channels of the optical material is left behind on the substrate.

Photolightographic techniques are not entirely satisfactory for fabricating channel waveguides. In the first place, such techniques may leave rough edges on the channels, which can cause unacceptably high losses of light intensity. In the second place, unless special methods are adopted, photolithographic techniques are not suitable for fabricating optical waveguides from organic optical materials for reasons discussed below.

Recently, there has been increased interest in the use of organic optical materials for optical devices such as optical waveguides. In Auston et al., "Research on Nonlinear Optical Materials: An Assessment", 26 Applied Optics, pp. 211-234 (1987), which is incorporated herein by reference, a review is presented on recent research into optical materials, including organic and polymeric materials, and their use in optical devices. Many of these organic materials have highly desirable electro-optic or nonlinear properties. The conjugated polymers in particular, such as the polyacetylenes and polydiacetylenes, are known to have high third-order optical nonlinearities. These organic optical materials will be referred to herein as nonlinear organic or "NLO" materials. Not only do these NLO materials exhibit large optical nonlinearities, but they also have ultrafast (on the order of femtoseconds) response times. Thus, they appear to be suitable candidates for all-optical devices requiring only modest input or control power. Single-mode channel waveguides in particular can exploit the optical properties of NLO materials since the optical confinement provided by these structures results in a very high intensity of light being propagated over macroscopic distances without appreciable losses in intensity.

Heretofore, it has been difficult to fabricate low-loss, single mode channel waveguides from NLO materials for a variety of reasons. In the case of the conjugated polymers, such as the polyacetylenes and polydiacetylenes, the intractability of the substances has been an impediment to their use in the manufacture of optical devices. Only recently have several soluble polydiacetylenes been synthesized and described in the literature. See, e.g. Miller et al., 185 Makromol. Chem (1984), at p. 1727, and DE-OS 3347618 which are incorporated herein by reference. However, even with the advent of suitable solvents for NLO materials, another significant stumbling block to the manufacture of channel waveguides from NLO materials in the incompatibility of most NLO materials with known photolithographic techniques due to the high absorption of light by the NLO materials.

More specifically, typical channel waveguides are about 0.8–2 microns thick, most preferably about 1.5 microns thick. At thickness of about 1.5 microns, light losses are low during the propagation of the 1.3 to 1.67 micron light upon which most optical communication networks are based. However, because most NLO materials absorb ultraviolet light very strongly, the ultraviolet light which is used in photolithographic processes will not penetrate into the NLO layer more than about 0.4 microns in depth. It is therefore not possible to form channel waveguides with depths greater than about 0.4 microns out of NLO materials by standard photolighographic techniques.

In U.S. patent application Ser. No. 176,647 filed for G. L. Baker and C. F. Klausner, on Apr. 1, 1988 and assigned to the assignee hereof, a novel photolithographic technique is disclosed for manufacturing channel waveguides from polydiacetylenes. The technique disclosed therein involves several steps including the steps of applying more than one layer to a substrate and developing an image in one of the layers.

Other techniques which have been used in the past to manufacture single mode and multimode channel waveguides from NLO materials include growing nonlinear organic crystals in glass capillaries of various sizes (see, B. K. Nayer, "Optical Second harmonic Generation in Crystal-Core Fibers," OSA Digest of the 6th Topical Meetion on Integrated and Guided Wave Optics (1982)), and growing such crystals in the grooves of a glass substrate (see, S. Tomaru et al., Optics Commun., 50, 154 (1984)). However, these are difficult and cumbersome fabrication techniques.

Accordingly, it is an object of the present invention to provide a channel waveguide structure made from an optically nonlinear organic material.

It is a further object of the present invention to provide a channel waveguide structure made from NLO materials which can function, if desired, as a low-loss, single-mode or multimode channel waveguide at wavelengths of interest such as wavelengths in the range of about 1.3 to 1.67 microns.

It is another object of the present invention to provide a novel method for fabricating such a channel waveguide structure which method does not suffer from the deficiences of prior art techniques.

It is yet another object of the present invention to provide a simple method for fabricating a channel waveguide structure that does not employ photolithographic techniques.

SUMMARY OF THE INVENTION

These and other objects are achieved by means of the present invention which provides a channel waveguide structure which, in its broadest embodiment, comprises a substrate, a pattern of channels defined along a top surface of the substrate, the channels having a higher refractive index than the remainder of the substrate, and a planar film layer on top of the substrate. The planar film layer is made from a nonlinear organic ("NLO") material. The depth of the planar film layer and the channels can be adjusted, if desired, so that the channel waveguide structure functions as a low-loss, single-mode or multimode channel waveguide at wavelengths of interest such as wavelengths in the range of about 1.3 to 1.67 microns.

In a preferred embodiment, the channel waveguide structure of the present invention comprises a glass substrate with a channel pattern in its top surface produced by ion-exchange methods. The ion-exchange is controlled so that the depth of the channels is on the order of 0.25 to 0.75 microns, preferably 0.25 to 0.5 microns, which is insufficient to confine light at the wavelengths of interest. Most of the light is guided in the planar film layer formed on top of the channel pattern which is about 0.5 to 1.25 microns thick, along directions defined by the channel pattern in the substrate. Neither the channels in the substrate nor the film by themselves guide the light, but the complete structure guides the light. Because most of the light is confined to the planar film layer, the desirable nonlinear properites of the film layer are taken advantage of.

Also in accordance with this preferred embodiment of the invention, the planar film layer is made from a soluble conjugated polymer. Most preferably, the film layer comprises a soluble polydiacetylene, such as the polydiacetylenes known as poly(3BCMU), poly(4BCMU), or poly(TS12).

The present invention also provides a simple method for fabricating a channel waveguide structure, said method comprising carrying out ion exchange with a glass substrate to provide a channel pattern in the surface of the glass substrate, and applying a planar film layer on top of the surface having the ion-exchange channels defined therein, the film layer being made from a nonlinear organic material.

DETAILED DESCRIPTION OF THE INVENTION

Figure 1:
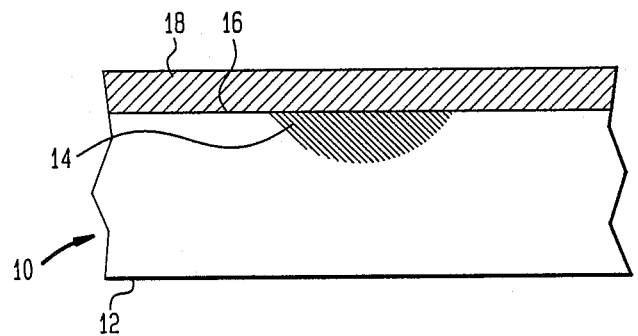
FIG. 1 is a sectional view of a single-mode channel waveguide structure in accordance with the present invention.

Referring to FIG. 1, a sectional view of a channel waveguide structure 10 in accordance with the present invention is illustrated. The waveguide structure 10 illustrated in FIG. 1 comprises a glass substrate 12 having a pattern of ion-exchanged channels 14 defined along a top surface 16 of the glass substrate. The ion-exchanged channels 14 are produced by conventional means in the glass substrate. Atop the glass substrate is a planar film layer 18 made from an NLO material. Planar film layer 18 is applied to top surface 16 of glass substrate 12 by spin coating in accordance with techniques well-known to those skilled in the art. The NLO material has a refractive index somewhat higher than that of the glass substrate.

A waveguide structure such as that illustrated in FIG.1 can function either as a multimode or, more desirably, as a single mode waveguide. Whether or not the waveguide structure 10 of the present invention will function as a single mode waveguide will depend on the wavelength of the light, the refractive index of film layer 18, and the thickness of the overall guide, including the thickness of film layer 18 and of channel 14. Most optical communication networks are based upon the propagation of 1.3 to 1.67 micron light. In order to guide light at this wavelength, it is desirable that the optical waveguides have depths of this order. Given a specific NLO material with a given refractive index, the thickness of channel 14 and film layer 18 can be tailored so that optical waveguide structure 18 functions as either a multimode or as a single mode waveguide for light having a wavelength of 1.3 to 1.67 microns. Typically, for suitable NLO materials, such as the polydiacetylenes known as poly(3BCMU), poly(4BCMU), and poly(TS12), channel 14 may be about 0.25 to 0.75 microns deep, while film layer 18 is about 0.5 to 1.25 microns thick. To function as a single mode waveguide, it is desirable that channel 14 be about 0.25 to about 0.5 microns thick when film layer 18 is 0.5 to 1.25 microns thick. Thus, in accordance with the present invention, neither the channel 14 in the glass substrate nor the film layer 18 of NLO material is thick enough by itself to guide light in the above-mentioned wavelength range.

Rather, both the ion-exchanged channel 14 defined in the glass substrate and the planar film layer 18 of NLO material together guide the light along the desired pathways. The distribution of light intensity between the channel 14 in the glass substrate and in the planar film layer 18 is roughly proportonal to the relative depths of the channel and the planar film layer. Since the planar film layer made from NLO material is on the order of twice the thickness of the channels in the substrate, most of the light is confined to the planar NLO material, thereby taking advantage of the desirable properties of the NLO material, while being guided along pathways defined by the ion-exchange channels in the glass substrate.

Many different organic materials can function as the NLO material. The conjugated polymers are especially suitable materials because of their desirable nonlinear properties. In particular, the polyacetylenes, and most preferably, the polydiacetylenes, are especially preferred materials which can function as the NLO material.

Polyacetylenes are linear polymers having alternating single and double bonds in the main chain. Polydiacetylenes are similar polymers having alternating single and triple bonds in the main chain. A large variety of groups may be attached as side chains to the main chain. Miller et al., 185 Makromol. Chem. (1984) at p. 1727, describe a number of polydiacetylenes which combine a conjugated backbone with large solubilizing side chains. These polydiacetylenes are soluble and relatively stable. They are prepared from diacetylene monomers by a solid state topatactic photopolymerization proces. This process involves a direct transition of crystalline diacetylene monomers having the general formula R—(C≡C)n—R'(n=2 to 4) to crystallized polymer chains.

In general, the film layer 18 may be made from any polydiacetylene material which can be dissolved in a suitable solvent and spin coated onto a substrate. Suitable polydiacetylenes for purposes of this invention have the general structural formula

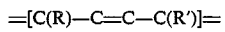

=[C(R)—C≡C—C(R')]= wherein R and R' are C1-C50 aliphatic groups, aromatic groups, or a combination of aliphatic and aromatic groups, with or without heteroatoms, and wherein R and R' may be the same or different.

The solubility of such polydiacetylenes is a function of whether there are significant solvent-side chain interactions. For example, polydiacetylenes wherein the R groups are long alkyl groups, are frequently soluble in nonpolar solvents, and polydiacetylenes wherein the R groups are polar groups, such as esters, urethanes, etc., are frequently soluble in polar solvents.

Specific examples of soluble polydiacetylenes which are suitable for the present invention are those listed in Table 1 below, taken from the above-referenced Miller et al., 185 Makromol Chem.

TABLE I

| Systematic Name | Abbreviation common in literature | Side chain Characteristics | Solvent |
|---|---|---|---|
| 1. Poly[1,2-bis-(anilinocarbon-lyoxymethyl)-1-buten-3-ynylene] | HDPU | ester | HMPA (hexamethyl-phosphoric triamide) |
| 2. Poly[1,2-bis-(p-tolyl-sulfonyloxymethyl)-1-buten-3-ynylene] | PTS | sulfonyl ester | nitrobenzene butyrolactone |
| 3. Poly[1,2-didodecyl-1-buten-3-ynylene] | C-28 | long hydrocarbon | decalin, nonp hydrocarbon |
| 4. Poly[1,2-bis[3-(N—valeryloxymethyl)-carbamoyloxy)propyl]-1-buten-3-ynylene] | P-3BCMU | hydrocarbon side chain urethane | $CHCl_3$, DMF |
| 5. Poly[1,2-bis[4-(N—valeryloxymethyl)-carbamoyloxy)butyl]-1-buten-3-ynylene] | P-4BCMU | hydrocarbon side chain, urethane | $CHCl_3$, chlorobenze |
| 6. Poly[1,2-bis[4-(p-tolylsulfonyloxy)-butyl]-1-buten-3-ynylene] | PTS-12 | hydrocarbon side chain, ester | $CHCl_3$ |
| 7. Poly[1,2-bis-[9-(plenylacetoxy)nonyl]-1-buten-3-ynylene] | P-PHE-22 | hydrocarbon side chain, ester | $CHCl_3$ |
| 8. Poly[1m2-bis[9-(isonicotinoyloxy)nonyl]-1-buten-3-ynylene] | P-NIC | hydrocarbon side chain, ester | $CHCl_3$ |
| 9. Poly[1,2-bis[4-(isonicotinoyloxy)butyl]-1-buten-3-ynylen] | P-NIC-12 | hydrocarbon side chain, ester | $CHCl_3$ |

Preferably, the planar film layer 18 is made from one of the polydiacetylenes known as poly(4BCMU), poly(3BCMU), or poly(TS12).The structure of these materaisl can be discerned from the systematic names given in Table 1 for these entries.

The present invention will now be described by reference to the following specific example.

A glass (Fisher-Premium) substrate was selected as the glass substrate. This glass has a refractive index of ca. 1.515 for light at a wavelength of 0.633 microns. High index channels were formed in the top surface of this glass substrate by subjecting the glass substrate to ion exchange. An aluminum mask with openings 1-10 microns wide was placed over the glass substrate which was immersed in a KNO3 melt at 375 degrees C. for eight hours. This ion exchange produced channels about 0.75 microns deep in the glass substrate. There was sufficient index change in the channels to guide light at 0.633 microns, but not at 1.3 microns.

A planar layer of poly(3BCMU), formally poly(4,6-decadiyne-1,10-diol bis{n-butoxycarbonylmethylurethane}], was applied to the glass substrate having the ion-exchanged channels defined therein. This was accomplished by dissolving poly(3BCMU) having a molecular weight of about 800,000 in dimethyl formamide and spin-coating the solution onto warm (40 degrees C.) substrates at 2000 rpm for 60 seconds. This produced films about 0.8 microns thick atop the glass substrate. This was followed by baking at 120 degrees C. to remove residual solvent.

To ensure that the channel waveguide structure has good optical surfaces, the end faces of the glass substrate had been mechanically polished before the polymer film was spin-coated onto the glass substrate. After applying the film layer to the glass substrate, the edges of the film mlayer were chemically polished to smooth the edge of the polymer and to reduce the edge bead.

Channel waveguides thus fabricated were tested by edge fire coupling light into the waveguides using a single-mode fiber. The output face of the guides was imaged onto an IR video camera so that the mode structure could be observed. With channels about 0.75 microns and a film layer about 0.8 microns in depth, the channel waveguide structures supported guided radiation at both 1.3 microns and at 0.633 microns with low losses, particularly for the 1.3 micron light. Approximate losses, including coupling losses, for the channel waveguide structures were in the range of about 5-8 dB for a waveguide structure about 5 cm long for the 1.3 micron light. Losses were greater than 20 dB for the 0.633 micron light. The greater losses at this wavelength are attributed to absorption in the film layer.

As observed on the video camera, the poly(3BCMU) channel waveguide structures of this example functioned as a single mode waveguide for the 0.633 micron light and as a dual mode waveguide for the 1.3 micron light. It is believed that the waveguide structure functioned as a single mode waveguide for the 0.633 micron light because the high absorption of light at this wavelength by the film layer reduced the effective thickness of the entire structure to about the wavelength of the light. On the other hand, with channels 0.75 microns deep and a film layer 0.8 microns deep, the total channel waveguide structure was slightly too thick to function as a single mode waveguide for light having a wavelength of 1.3 microns. It is expected that the channel waveguide structure of this example would support single mode radiation at this wavelength if the ion exchange channels were about 0.25 to 0.5 microns thick while the poly(3BCMU) layer were about 0.5 to 1.25 microns thick.

While the invention has been described by reference to specific examples, this was for purposes of illustration only and should not be construed to limit the spirit or the scope of the invention.

What is claimed is:

1. A channel waveguide structure, comprising
   a substrate having a surface,
   a channel pattern defined in said substrate adjacent said surface, said channel pattern comprising regions of higher refractive index than the remainder of said substrate, and
   a planar film layer on top of said surface, said film layer being made from an organic material that is characterized by a nonlinear index of refraction.

2. The channel waveguide structure of claim 1, wherein said substrate comprises glass.

3. The channel waveguide structure of claim 1, wherein said channel pattern comprises regions of different ion composition than the remainder of said substrate.

4. The channel waveguide structure of claim 1, wherein said nonlinear material is a conjugated polymer.

5. The channel waveguide structure of claim 1 wherein said nonlinear material is a soluble polydiacetylene having the general formula $$=[C(R)-C\equiv C-(R')]=$$

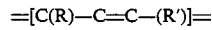

wherein R and R' are selected from the group consisting of C1-C50 aliphatic groups, aromatic groups, and a combination of aliphatic and aromatic groups.

6. The channel waveguide structure of claim 1 wherein said organic material is selected from the group consisting of poly(4BCMU), poly(3BCMU), and poly(TS12).

7. The channel waveguide structure of claim 1, wherein said nonlinear organic material is a conjugated polymer.

8. The channel waveguide structure of claim 1 wherein said organic material is a soluble polydiacetylene having the general formula $$=[C(R)-C\equiv C-C(R')]=$$

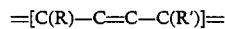

wherein R and R' are selected from the group consisting of C1-C50 aliphatic groups, arommatic groups, and a combination of aliphatic and aromatic groups.

9. The channel waveguide structure of claim 1 wherein said organic material is selected from the group consisting of poly(4BCMU), poly(3BCMU), and poly(TS12).

10. A channel waveguide structure, comprising
    a glass substrate,
    a pattern of ion-exchanged channels defined along a surface of said glass substrate, said channels having a higher index of refraction than the remainder of said substrate, and
    a planar film layer on top of said surface, said film layer being made from an organic material that is characterized by a nonlinear index of refraction.

11. A method for producing a channel waveguide structure, comprising
    subjecting a glass substrate to ion exchange to define a channel pattern therein adjacent a surface of said substrate, and
    applying a planar film layer on top of said substrate, said film layer being made from an organic material that is characterized by a nonlinear index of refraction.

12. The method of cliam 11 wherein said nonlinear organic material is spin-coated onto said substrate.

13. The method of claim 11 wherein said nonlinear organic material comprises a conjugated polymer.

14. The method of claim 11 wherein said organic material is a soluble polydiacetylene having the general formula $$=[C(R)-C\equiv C-C(R')]=$$

wherein R and R' are selected from the group consisting of C1–C50 aliphatic groups, aromatic groups, and a combination of aliphatic and aromatic groups.

15. The method of claim 11 wherein said organic material is selected from the group consisting of poly(4BCMU), poly(3BCMU), and poly(TS12).

* * * * *

UNITED STATES PATENT AND TRADEMARK OFFICE
CERTIFICATE OF CORRECTION

PATENT NO. : 4,834,480

DATED : May 30, 1989

INVENTOR(S) : Gregory L. Baker, Janet L. Jackel, and Nicholas E. Schlotter

It is certified that error appears in the above-identified patent and that said Letters Patent is hereby corrected as shown below:

```
Column 1, line 24, "direction" should read --directions--;
          line 59, "consists" should read --contains--.
Column 3, line 3, "thickness" should read --thicknesses--.
Column 6, line 63, "materaisl" should read --materials--.
Column 7, line 27, "mlayer" should read --layer--.
Column 8, line 41, "arommatic" should read --aromatic--;
          line 65, "cliam" should read --claim--.
```

Signed and Sealed this

Twenty-third Day of June, 1992

Attest:

DOUGLAS B. COMER

*Attesting Officer*  *Acting Commissioner of Patents and Trademarks*